UNITED STATES PATENT OFFICE.

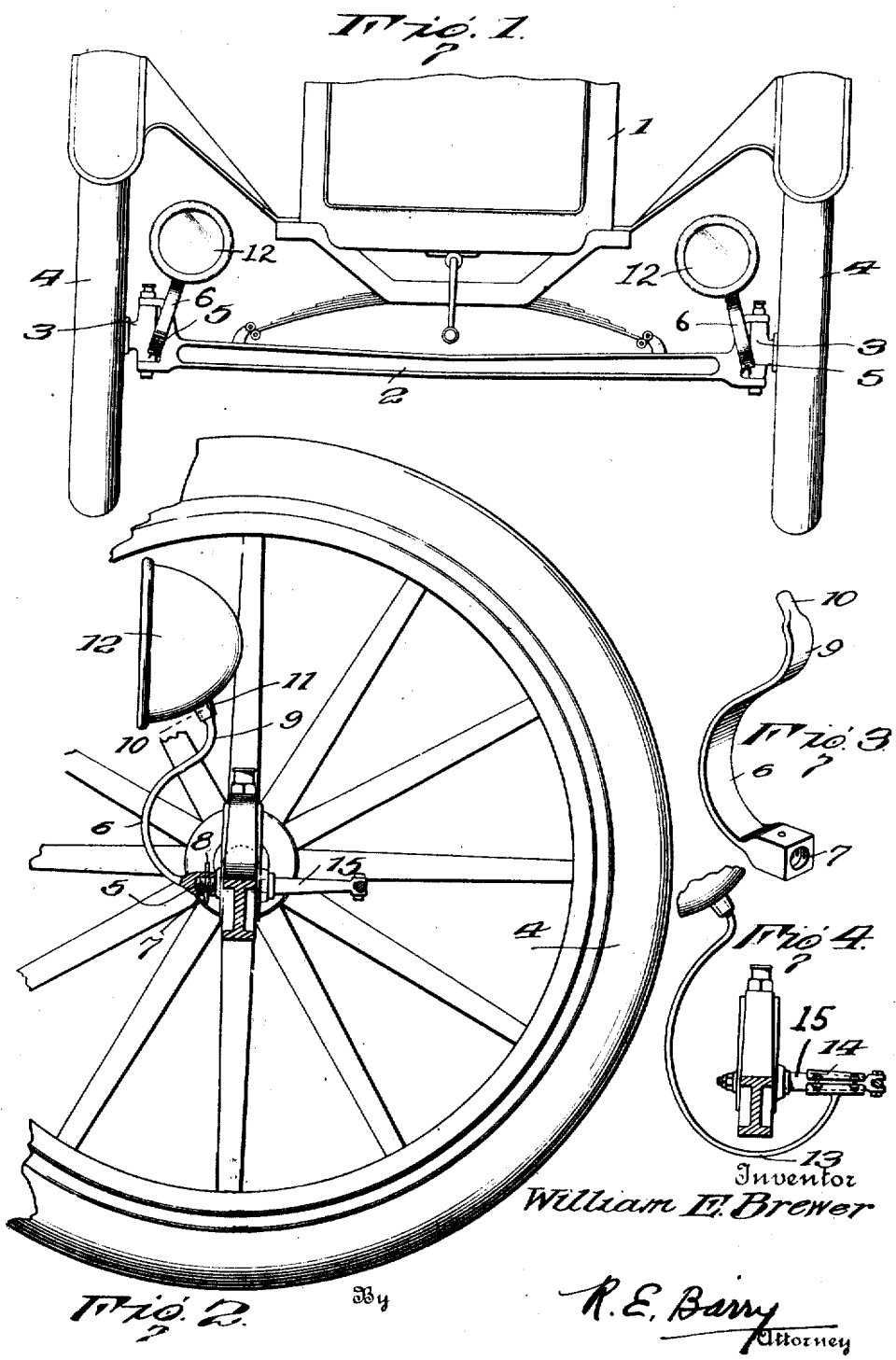

WILLIAM E. BREWER, OF CHATTANOOGA, TENNESSEE.

DIRIGIBLE HEADLIGHT.

1,359,226.

Specification of Letters Patent.  Patented Nov. 16, 1920.

Application filed March 1, 1920. Serial No. 362,222.

*To all whom it may concern:*

Be it known that I, WILLIAM E. BREWER, a citizen of the United States, residing at Chattanooga, in the county of Hamilton and State of Tennessee, have invented certain new and useful Improvements in Dirigible Headlights, of which the following is a specification.

This invention relates to improvements in illuminating devices for motor vehicles and it is particularly directed to an improved dirigible head light mechanism.

Prior to the present invention, many operating devices for dirigible head lights have been devised, but these prior constructions are more or less complicated and expensive to manufacture and in consequence they have not gone into general use. The main object of my invention is to furnish a device which will be of inexpensive and simple construction and which may be attached to vehicles now in use without changing or modifying the construction of said vehicle.

The steering knuckles of most motor vehicles are provided with forwardly extending threaded projections which form the front extremities of the rods which operate or manipulate the steering knuckles and I contemplate attaching a resilient bracket to this forward extremity and mounting a spot light or head light directly on this bracket, so that it will turn with the vehicle wheels and illuminate the road way forward of the steering wheels.

In some instances a speedometer or other device might interfere with mounting the bracket upon the forward extension of the steering knuckle operating arm and in this event, the bracket may be extended and attached directly to said arm.

With the foregoing objects outlined and with other objects in view, which will appear as the description proceeds, the invention consists in the novel features hereinafter described in detail, illustrated in the accompanying drawing and more particularly pointed out in the appended claims.

Referring to the drawings:

Figure 1 is a front view of an ordinary motor vehicle with my improvements applied thereto.

Fig. 2 is a sectional detail view taken through the front axle of said vehicle.

Fig. 3 is a perspective view of the preferred form of my improved resilient bracket.

Fig. 4 is a similar view of a modified form of bracket.

In the drawing, 1 represents a motor vehicle having the usual stationary front axle 2 provided at its extremities with steering knuckles 3 to which the steering wheels 4 are attached. Each one of these steering knuckles is provided with a forward extension 5 which is threaded and usually forms part of the rod which operates the steering knuckle. Ordinarily this threaded projection 5 is secured in place by a nut which is connected to the same and in attaching my improved resilient lamp bracket 6, I remove this nut.

My resilient bracket is of approximately U-shape form as shown and it is provided at one end with a member 7 having internal screw threads. When the bracket is to be attached to the threaded member 5, the front wheel 4 is removed and the member 7 is screwed on to the extension 5 to take the place of the ordinary nut. After the bracket has been turned a sufficient number of times to tighten the member 7 on the part 5, the ordinary cotter pin 8, which forms a nut lock for the ordinary nut, is replaced in front of the member 7 and acts to lock the same together with the bracket 6, in a fixed rigid position.

The other end 9 of the bracket 6 is provided with a vertical shank 10, which is engaged by the usual socket 11 of an ordinary head light or spot light 12.

In operation, the resilient brackets 6 will turn with the steering wheels and as the lamps are located close to the center of the wheels, their rays will be directed forwardly in front of the steering wheels, so that the operator of the vehicle may have a clear view of the road directly in front of the vehicle, at all times.

In some cases, the mounting of a speedometer or other device might interfere with placing the bracket on the forward extension 5 and in such case, I contemplate extending the lower portion of the bracket beneath the axle, as shown at 13, the lower end of the modified bracket being provided with a clamp or other fastening means 14 for securing the bracket to the manipulating or operating rod 15 of the steering knuckle.

I am aware that various changes and modifications may be made in the construction shown without departing from the spirit of the invention as set forth in the following claims.

What I claim and desire to secure by Letters Patent is:—

1. The combination with a motor vehicle having a stationary front axle provided at one end with a steering knuckle, having a vertical axis, a threaded member extending forwardly from said steering knuckle, a curved flexible resilient bracket having a threaded member screwed on to said threaded extension, an attaching member carried by said bracket and a lamp secured to said attaching member.

2. A bracket for supporting a head light comprising a curved flexible resilient member provided at one end with a threaded member designed to be secured to a steering knuckle and provided at its other end with an attaching member for securing a lamp thereto.

WILLIAM E. BREWER.